United States Patent

[11] 3,586,221

[72] Inventor Marvin Rosen
     Clark, N.J.
[21] Appl. No. 853,871
[22] Filed Aug. 28, 1969
[45] Patented June 22, 1971
[73] Assignee Air Reduction Company, Incorporated
     New York, N.Y.

[54] TORQUE CONTROL OF MULTIPLE MOTORS FOR UNIFORM FEED OF WELDING WIRE
11 Claims, 6 Drawing Figs.

[52] U.S. Cl. .................................................. 226/1,
     219/131, 226/42, 226/108, 226/188, 314/69
[51] Int. Cl. .................................................. B65h 23/22
[50] Field of Search ........................................ 226/25, 42,
     1, 108, 188; 314/69; 219/130, 131, 131 F

[56] References Cited
UNITED STATES PATENTS
3,293,477 12/1966 Lobosco ........................ 226/188 X
3,443,145 5/1969 Margrain ........................ 219/130 X Primary Examiner—Richard A. Schacher
Attorneys—Larry R. Cassett, Edmund W. Bopp and H. Hume Mathews ABSTRACT: A multiple servo load torque control system for uniform push-pull feed of welding wire from a supply reel to a welding gun comprises a "pull" servo motor at the welding gun and a "push" servo motor in tandem between the gun and reel for feeding the wire; a pull motor speed regulating amplifier having as input a wire speed reference signal, with velocity and load torque feedback signals from the pull motor; a push motor load torque regulating amplifier having as input a load torque master signal from the pull motor proportioned according to desired division of load torque between the motors, and a load torque comparing signal from the push motor; both servomotors receiving respectively amplifier regulated power through time-ratio-control transistorized power switching, and having torque limiting overload control.

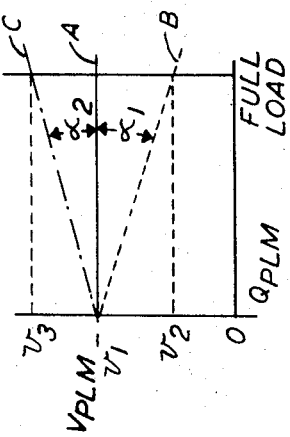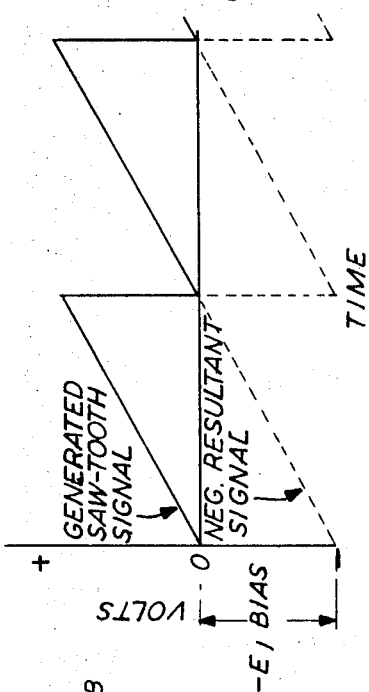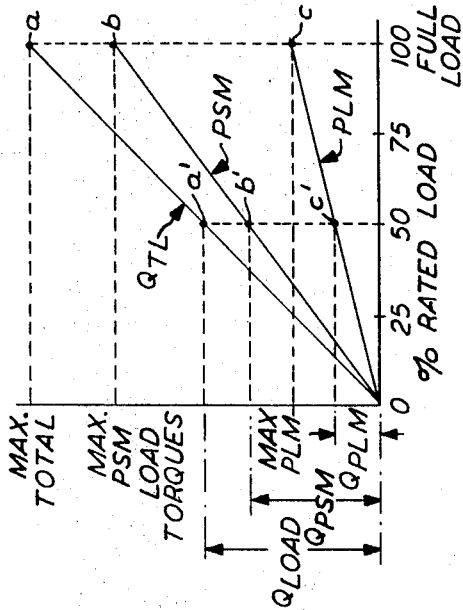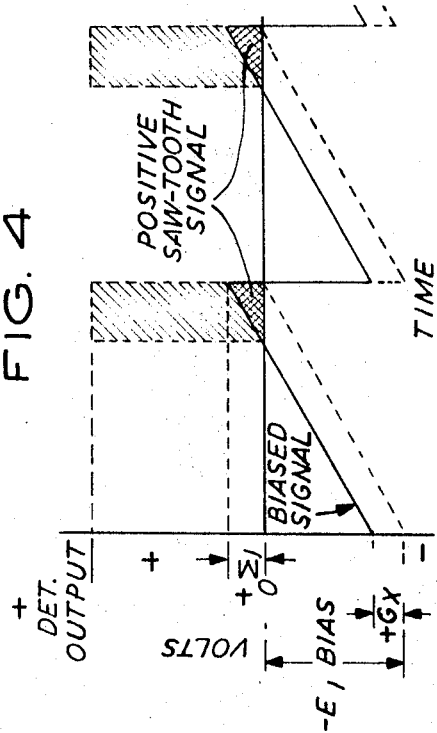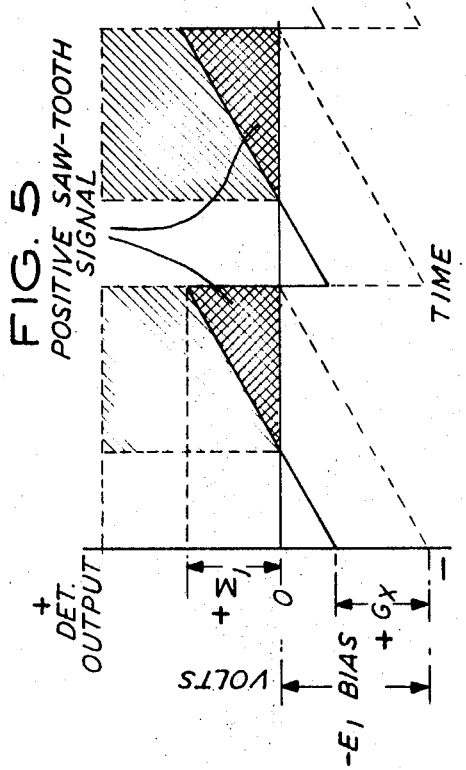

TORQUE CONTROL OF MULTIPLE MOTORS FOR UNIFORM FEED OF WELDING WIRE

CROSS-REFERENCE TO RELATED APPLICATION

My copending U.S. application Ser. No. 853,870 filed Aug. 28, 1969 for "Speed Control System for Multiple Motor Feed of Welding Wire" and assigned to the same assignee as the present invention, discloses in part subject matter similar to that disclosed herein, and further discloses and claims a different control system for obtaining uniform wire feed.

BACKGROUND OF THE INVENTION

The feed of welding wire from a supply reel to a welding torch or gun is often accompanied by wire control problems, especially where the feed rate, wire length from reel to gun, weight of wire and other factors require that the feed load be divided between at least two servomotors for push-pull operation located in tandem along the wire. One servo, generally termed the "pull" motor, is located near or at the gun and its desired function is to establish and maintain a selected rate of wire feed; the other servo termed the "push" motor is located at a suitable point between the pull motor and reel and its desired function is to prevent buildup of excessive wire-pull tension produced by the pull motor, while drawing from the reel no more wire than is called for by the pull motor.

In practice, when the pull and push motors are operating properly, the wire tension is sufficient to prevent slack that could cause looping and kinking of the wire at normal feed rates, and is beneath a value that could cause undue stress on, and stretching or breaking of the wire with resulting malfunction. Under ideal conditions, the wire is smoothly fed at uniform rate from reel to gun.

Heretofore such push-pull control has been difficult to achieve due to motor load or torque variations at the individual motors with improper division of the load between them. This in turn, tends to cause overloading of one or the other of the motors with resulting differences in feed motor speeds and malfunction. Various methods have been proposed for ensuring uniform wire feed in tandem motor systems, such as by matching the motor characteristics, or by using a pull motor having a "drooping" speed-load characteristic, and a push motor having a constant speed-load characteristic, the purpose here being to allow the pull motor which has a no-load speed higher than the selected wire feed, to pick up the load as required. However, the prior art methods insofar as presently known, fail to compensate properly the factors tending to cause unbalance between the motor loads, especially during transient load variations, so that the wire feed often becomes irregular with resulting malfunction.

The present invention is concerned with control of load torque division between multiple servomotors in push-pull relation while feeding at a uniform selected rate flexible material such as welding wire, between two materially spaced stations.

SUMMARY OF THE INVENTION

In accordance with the invention in a preferred embodiment thereof, welding wire is passed to a welding gun from a comparatively remote supply reel by a uniform feed controlling or master pull motor located at the welding gun, and a push motor located nearer the supply reel. The push motor is slaved as regards its predetermined proportional share of load torque, to the master feed controlling pull motor according to compared signals representing the push motor torque and the pull motor torque respectively.

The feed controlling pull motor is controlled according to compared signals representing the velocity and load torque respectively of the pull motor, and the selected wire speed or velocity reference. The resultant signal represents variation from the reference wire speed, i.e. error, and is used in a time-ratio-control system with transistorized power switching for controlling application of speed regulating power to the pull motor. A similar push motor time-ratio-control system is operable according to the resultant of the compared torque signals mentioned above, for controlling application of power to the torque-slaved push motor. Both motors are protected from overload by respective load torque feedback signals for reducing the switched power when load torque exceeds a safe reference value.

A principle object of the invention therefore is to provide an improved wire feed load torque control system for multiple servo feed motors connected in tandem for push-pull operation, wherein both perfect load torque sharing between the motors and a selected rate of wire feed are maintained notwithstanding nonuniform feed conditions.

Another object is to provide an improved wire feed control system of the character described above wherein the load torque of the push motor is regulated according to that of the pull motor for achieving a balanced condition of wire feed load at uniform wire feed speed.

A further object is to provide an improved wire feed load torque control system that is efficient and reliable for maintaining without malfunction smooth and uninterrupted push-pull feed of welding wire to a welding gun from a comparatively remote supply reel.

A further related object is to provide an improved wire feed load torque control system for proportionately dividing the wire feed load between the pull and push motors, and wherein the pull motor at the welding gun may for example, have a maximum load rating materially lower than that of the wire supplying push motor.

Other objects, features and advantages will appear from the following description with reference to the accompanying drawings.

BRIEF DESCRIPTION OF THE DRAWINGS

FIG. 2 is a speed torque characteristic chart illustrating the control of the master pull motor of FIG. 1;

FIGS. 3, 4, and 5 graphically illustrate system control signals under different speed and torque correction conditions, and FIG. 6 graphically illustrates load-torque division between the feed motors.

DESCRIPTION OF PREFERRED EMBODIMENT OF THE INVENTION

Figure 1:
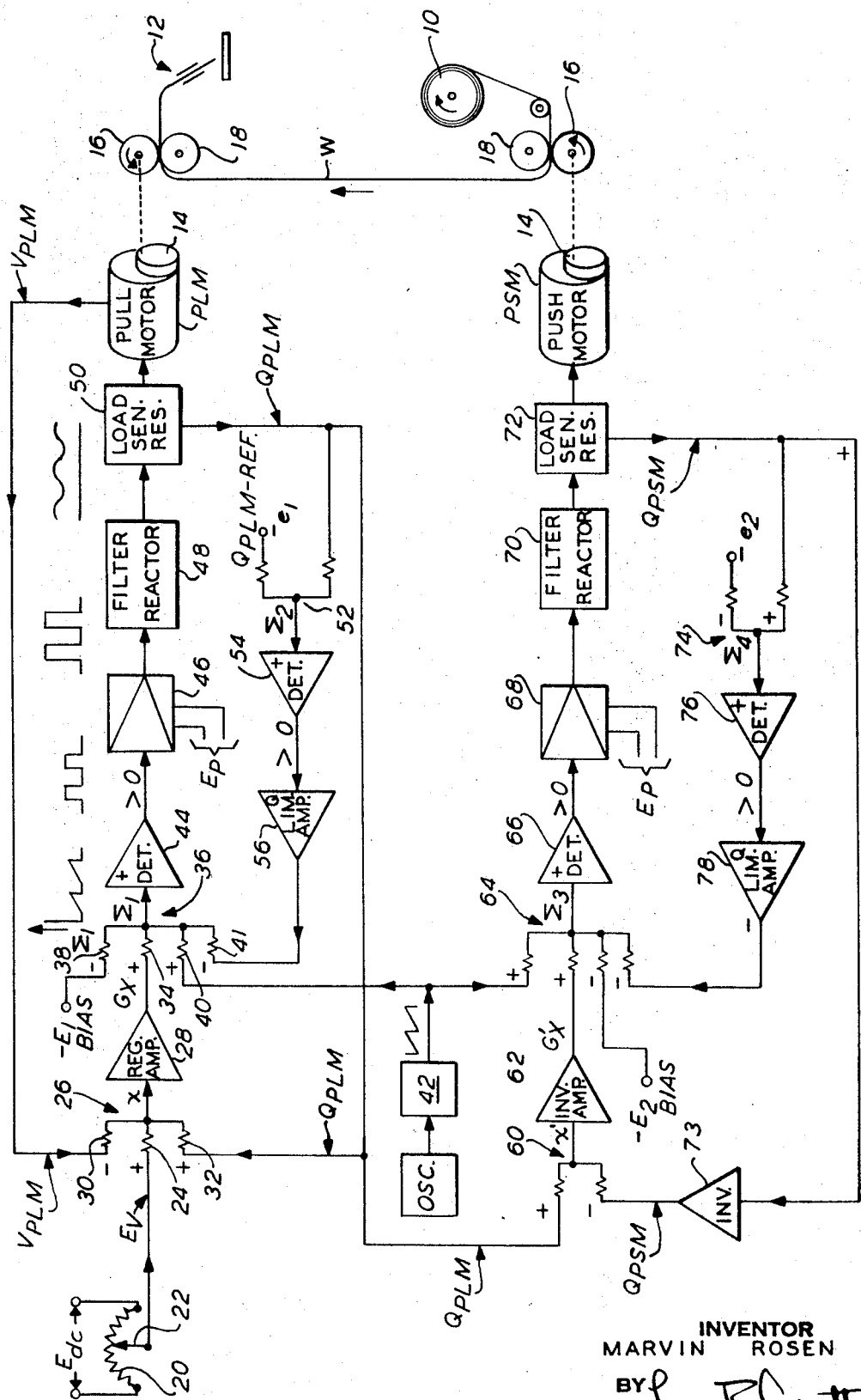
FIG. 1 is a flow-type diagram of an electrical load torque control system for wire feed servomotors embodying the invention.

Referring to FIG. 1 of the drawings, welding wire W is fed from a supply reel 10 to a welding torch or gun generally indicated at 12, by a pull servomotor PLM located near or integrated with the welding gun, and a push servomotor PSM that is suitably located between the pull motor and the reel, the servomotors being as shown, arranged in tandem along the wire. Each motor drive includes conventional speed reduction gearing generally indicated at 14 that is in turn, connected to a driving roll 16 for passing wire from the reel 10 to the gun 12 between each driving roll and its friction-driven guide or idler roll 18. The servomotors are of conventional direct current type wherein the output torque is proportional to the input power current and preferably, although not necessarily, have similar characteristics. The pull motor as disclosed herein has a normally drooping speed-torque characteristic. The pull motor establishes and maintains the selected rate of wire feed, such as for example 200 in./min., and the push motor is related to the pull motor so that its load torque is regulated primarily by the load torque of the pull motor for ensuring a predetermined and proper balance of the wire feed load between the motors.

By such balancing or proportioning of load torques, the pull motor PLM, which is commonly integrated with the welding gun unit, can be of comparatively low power rating, i.e. sufficient to feed the oncoming wire into the gun. The pull motor, therefore, can be of light weight for facilitating manipulation of the gun by the welder. In such instances, the push motor PSM, ordinarily on a stationary base, can be larger and of much higher power rating for handling the major portion of the wire feed load.

Referring more specifically to the electrical control system for regulating the wire feed speed and the load torques of the respective servomotors, a speed or velocity reference signal $E_r$, representing the desired rate of wire feed, is derived from a potentiometer 20 that is energized by a suitable constant source of direct current $E_{dc}$, the reference voltage or signal being determined by the setting of the potentiometer slider 22. The reference signal $E_r$ is fed at 24 to the input network 26 of a high-gain regulating amplifier 28, together with a velocity signal $V_{PLM}$ at 30 representing the speed of the pull motor, and a torque signal $Q_{PLM}$ at 32 representing the pull motor load. These signals are derived respectively, as feedback velocity and torque signals from the pull motor PLM. The input network signals, adjusted by conventional proportioning resistances and polarized as indicated, are algebraically summed to produce an error signal $\chi$ of small magnitude that is amplified by the high-gain amplifier 28 for producing a resultant control signal $G_x$ representing variation, or error, from the selected speed reference. The velocity feedback signal $V_{PLM}$ is readily obtained in known manner from the circuitry of the pull motor, etc., and the torque feedback signal $Q_{PLM}$ may be suitably derived according to the input power current to the motor. Alternatively, the torque signal can if desired be derived in known manner from the mechanical output of the motor at the drive shaft.

As the objective is to achieve uniform wire feed notwithstanding torque variations at the respective motors, the speed of the master motor PLM must be maintained constant, notwithstanding its normal characteristic tendency to drop off in speed with increase in load where a substantially constant voltage is applied to the motor armature. As diagrammatically shown by FIG. 2, the network input signals are related to the normal speed-torque characteristic curve of the assumed motor PLM for achieving a resultant constant speed-torque characteristic represented by line A, i.e. the ideal condition for a selected wire-feed speed such as $v_1$, corresponding to the selected reference signal $E_r$. The normal motor characteristic for constant voltage supply, however, is shown by line B wherein the speed has dropped off to a value $v_2$ for the full load condition.

For achieving the ideal condition wherein the motor speed remains constant at the value $v_1$, a signal of opposite polarity ($Q_{PLM}$) representing the magnitude of motor torque at a given motor speed ($V_{PLM}$) is superimposed on the reference speed signal ($E_r$) that represents $v_1$ only for the no-load condition. The effect of the superimposed torque signal is to force a rising characteristic of the motor applied voltage as represented by line C.

It will therefore be seen that if the motor PLM (assuming normal characteristic B) is operated from the rising speed characteristic C, the resultant characteristic is indicated by line A, i.e. a constant speed ($v_1$) characteristic over the full range of load. The resultant characteristic is obtained empirically by first determining the normal characteristic droop angle $\alpha_1$ of the motor PLM; the rising characteristic angle $\alpha_2$ is made equal to $\alpha_1$ by proportioning of the oppositely polarized torque signal $Q_{PLM}$.

Referring back to the function of the input signal summing network 26, the absolute magnitude of the speed signal $V_{PLM}$ is equal to the summed magnitudes of the reference signal $E_r$ and the load torque signal $Q_{PLM}$ respectively, less the error signal $\chi$. Since the regulating system has very high gain, the error signal $\chi$ can be extremely small for control purposes. Accordingly, for normal operation the signal $V_{PLM}$ may be considered as equal in magnitude to the summation of the signals $E_r$ and $Q_{PLM}$.

The regulating high gain amplifier output $G_x$ is used as the error signal for ultimately determining the input power voltage for the motor PLM, and to this end the signal is fed at 34 to a summing input network 36 of a time-ratio-control system of known type described below. The other network detector inputs include essentially a negative bias voltage $-E_1$ at 38 and a sawtooth voltage at 40. The sawtooth voltage of selected frequency is derived in usual manner from a sawtooth generator 42 energized by an oscillator OSC. The resultant of the algebraically summed signals, $\Sigma_1$, is a sawtooth voltage varying in amplitude according to the magnitude of the error signal $G_x$, i.e. the sawtooth voltage $\Sigma_1$ increases in magnitude with increase in $G_x$ as will be seen by reference to FIGS. 4 and 5, described below.

This sawtooth voltage of varying magnitude is fed to a so-called positive (+) detector 44 that limits the output to positive values, i.e. in excess of zero, and amplifies and converts positive sawtooth voltage pulses to spaced square waves as graphically indicated. The square wave output voltage still at sawtooth generator frequency, is fed to electronic transistorized switching circuitry of known type generally indicated at 46 and having a power source $E_p$ for supplying switched direct current to the motor PLM.

The transistorized pulse control and switching circuitry referred to above applies power to the motor PLM through conventional on-off pulse technique herein referred to as "time-ratio-control." Summarizing briefly the operation of the first pulse control stage, the positive (+) detector 44 senses and is responsive to positive $\Sigma_1$ input signals and amplifies these signals up to the limit of the comparatively low DC power supply (not shown) of the detector, i.e. the detector saturates up to the limit of its DC supply voltage.

The time-spaced square wave pulses so produced are indicated by the conventional graph opposite the detector output. In the following control stage, the pulses are amplified in the transistorized switching unit 46 as indicated graphically at the output, i.e. the circuitry saturates (as in the positive detector) up to the limit of the main power supply voltage $E_p$, and the time-space pulses as amplified represent the amount of power applied to the motor PLM.

Reference is here made to FIGS. 3, 4, and 5 for generally describing the pulse control in relation to the error signal $G_x$ and the pull motor power input. FIG. 3 represents a transient condition at the input network 36 of detector 44 where $G_x$ is zero or less, due for example to a sudden decrease in load torque at the pull motor with consequent tendency toward increased motor speed. Accordingly, as the negative bias $-E_1$ has been selected to match the maximum amplitude of the normal sawtooth voltage from generator 42, the resultant voltage $\Sigma_1$ is zero or less, the output of the positive detector 44 is zero, and minimum power at 46 is switched to the pull motor PLM. The motor speed accordingly tends to drop back toward the reference speed and the network signals are readjusted so that the pull motor speed tends to be stabilized at the reference speed.

FIG. 4 represents a small $G_x$ error signal indicating a small transient drop in motor speed due to load torque increase, for example. In this instance, the combined positive $G_x$ and sawtooth voltages exceed the negative bias $-E_1$ by a small amount represented by $+\Sigma_1$ so that the detector output consists of comparatively narrow square wave pulses that correspond in time-base width to the resultant sawtooth voltage, and in amplitude to the low DC voltage of the detector. These time-spaced square wave signals are amplified at the power switch 46 up to the limit of the main power supply $E_p$, and the comparatively low average correction voltage is applied to the motor PLM for the required increase in speed.

In FIG. 5, the $G_x$ signal is comparatively large indicating for example, greater load increase and material fall-off in speed of the motor PLM. Here, the larger resultant sawtooth pulses $\Sigma_1$ have comparatively broad time bases with correspondingly broad time bases for the square wave pulses at the detector output. The amplified square wave power pulses therefore represent much greater average correction power, so that the speed of motor PLM is more positively brought up to the reference speed.

The power switch output from 46 is connected as indicated above, through the smoothing reactor filter 48 and the load-sensitive resistance 50 to the motor PLM. The load torque signal $Q_{PLM}$ is derived in known manner according to the current in the load-sensitive resistance, i.e. the pull motor input current.

In case of excessive overload on motor PLM, the torque signal $Q_{PLM}$ is applied through a separate torque limiting circuit for reducing the positive detector input $\Sigma_1$ to zero or less for minimum power to the motor. To this end, the actual torque signal $Q_{PLM}$ and an oppositely polarized signal $-e_1$ representing maximum allowable torque $Q_{PLM}$REF. (torque reference) are matched and the difference is applied to the input network 52 of the positive detector 54. The detector input signal $\Sigma_2$ is therefore normally negative so that there is no output at the detector 54, and hence at the series-connected torque limiting amplifier 56, the output of which is connected to the input network 36 of the positive detector 44. If, however, the actual motor torque should exceed the reference torque, the output of detector 54 is a positive signal that is fed to the torque limiting inverting amplifier 56. The resultant negative output signal at the network input 41 accordingly reduces the detector input signal to zero or less, thereby shutting off motor correction power. If this overload condition is transient and the motor torque drops back to its normal range, the torque limiting signal is removed in the manner described above and the normal operation of the system is resumed.

The torque-slaved push motor PSM is energized by an essentially similar time-ratio-control circuitry, except that the reference signal is not constant; rather it is variable according to the actual load torque of the pull motor PLM in whatever ratio is desired. To this end the load torque signal $Q_{PLM}$ from the pull motor circuitry is used, subject to desired proportioning, as the reference voltage for the push motor PSM. This reference signal is compared with a proportioned torque feedback signal $Q_{PSM}$ from the push motor for its basic control.

Specifically, the push motor input network 60 for the main signal amplifier 62 has but two inputs, namely the pull motor torque reference or master signal $Q_{PLM}$ described above, and the push motor feedback load torque signal $Q_{PSM}$. The signal $Q_{PSM}$ is derived in similar manner to that for the signal $Q_{PLM}$, i.e. according to the input current for the push motor from a load-sensitive resistance 72 at the motor input. This signal is fed to an inverter 73 so that it is polarized in opposition to the master torque signal $Q_{PLM}$. From the oppositely polarized signals a resultant or different signal is obtained that is amplified in the inverting amplifier 62 for producing an error signal $G'_x$. This signal, together with sawtooth voltage signals from the generator 42 and a negative bias voltage $-E_2$, constitute the inputs of the summing network 64 for the positive detector 66, generally as described above. The resultant signal $\Sigma_3$ that is normally greater than zero, is processed at the detector 66 and power switching unit 68 in the manner previously described for producing power pulses of square wave form that are averaged at the filter 70 for constituting the DC correction power input to the motor PSM. It will be apparent from the previous description that as the torque reference signal $Q_{PLM}$ is continuously compared with the actual push motor torque signal $Q_{PSM}$, the resulting error signal $G'_x$ tends to maintain the torque of the push motor in conformity with or in direct relation to the master signal $Q_{PLM}$, i.e. the instant load torque of the pull motor.

As previously mentioned, the load torque division can be made according to the desired size and weight of the pull motor ordinarily installed in the welding gun. In addition to the advantage of having a small, lightweight pull motor of low power rating in the welding gun unit, a lower voltage can if required, be used for operating this motor, thereby increasing the safety factor. The major part of the wire feed load can be assigned to a larger heavier push motor. This is also a significant advantage as the push motor is often required to start on high inertia and friction loads, as where a large wire supply reel is used. For such load sharing between the motors, the master or reference load torque signal from the pull motor and the push motor feedback signal are proportioned at the input network 60 so that the push motor is required to develop a load proportional according to the desired ratio of the load on the master pull motor. This ratio may be unity or greater than unity as desired.

It follows, therefore, that the wire feed speed of the push motor is indirectly controlled according to load torque for maintaining uniform wire feed. For example, if the speed of the push motor tends to increase, thereby drawing an excess amount of wire from the reel, the proportionate increase of its torque signal at the input network 60 results in a correction signal $G'_x$ that tends to counteract the increased speed and to return the push motor to a speed where its torque is in normal relation to that of the pull motor. This automatically restores the push motor to the reference wire feed speed, as otherwise the torque signals at the input network 60 would be unbalanced.

Proportioning of the total wire feed load between the pull and push motors is graphically illustrated by FIG. 6, wherein load torques are related to the normal power output or load ratings of the respective motors. The total wire feed load that is to be divided in preferred manner between the feed motors is represented by line $Q_{TL}$ with maximum load at point $a$. Assuming that the desired ratio of load distribution is approximately 3:1 for example, throughout operation of the motors up to their respective permissible limits, the full load ratings of the push and pull motors may be relatively represented by points $b$ and $c$ on the corresponding torque lines PSM and PLM respectively, i.e. approximately in the ratio of 3:1. This ratio holds throughout the range of total wire feed load $Q_{TL}$. For example, at 50 percent of the feed load represented by point $a'$, it is seen that push motor torque $Q_{PSM}$ will correspond to the value at point $b'$, and the smaller pull motor torque $Q_{PLM}$ will correspond to the value at $c'$ so that the same ratio is maintained.

The essential concept therefore is that the pull motor irrespective of its size or power rating, control the proportionate division of load torque between the two feed motors as preferred, throughout both transient velocity variations from the reference wire feed rate, and changes in operating conditions.

As the motors can operate within corresponding percentages of their respective ratings due to the predetermined division of load as described above, optimum conditions exist for motor and control equipment protection and for longer motor life; that is, each motor is subjected to heating and wear only for its proper share of the load within its respective rating, thereby minimizing operation and maintenance costs.

Although in the assumed case described with reference to FIG. 6, the ratio between the power ratings of the feed motors corresponds to the ratio of load torque division between the motors, the latter ratio can vary somewhat, depending on operating conditions. For example, it is generally desirable from the welder's standpoint that the welding gun motor (pull) run cool; in this instance, the reel motor (push) can assume a larger proportion of the feed load, especially where it is materially larger and heavier and therefore capable of running somewhat hotter without operational difficulty.

In practice, the respective motor ratings are selected so that both motors operate well within their full load capacities. Load variations may be due to manipulation of the gun by the welder, weld metal spatter, and/or wear of the contact tube and casing, and power source fluctuations. The rate of wire feed is ordinarily affected only in transient manner by any one or a combination of such load conditions. However, under abnormal and unforeseen conditions, an overload condition at one or the other motors is possible. In the case of the push motor overload torque control, a torque feedback signal is used in the manner of the pull motor overload torque system for reducing power to the motor PSM when its torque exceeds a predetermined safe maximum. The actual push motor torque signal $Q_{PSM}$ is derived from the load-sensitive resistance 72 and is compared in the network 74 with a reference or maximum torque signal $-e_2$ representing $Q_{PSM}$–REF and the resultant signal $\Sigma_4$, normally less than zero, is fed as above described to the positive detector 76, hence to the torque limiting amplifier 78. The amplifier output signal is inverted and appears as negative at the input network 64 of the detector 66. Accordingly, when a negative signal appears at the network 64 from the torque limiting amplifier, the resulting signal $\Sigma_3$ becomes negative and power is reduced for the push motor, thereby avoiding overloading.

Having set forth the invention in what is considered to be the best embodiment thereof, it will be understood that changes may be made in the system and apparatus as above set forth without departing from the spirit of the invention or exceeding the scope thereof as defined in the following claims; it will also be understood that language relating to the respective locations of the "pull motor" and "push motor" as used in the claims, is intended to indicate but generally the precise positions of the feed motors in practice. For example, the expression "pull motor located at the welding unit" is intended to mean that the pull motor can be structurally incorporated in the welding unit, or located adjacent to or sufficiently near the welding unit (or station) for positive wire feed, depending on the size and weight of the motor, stiffness of welding wire and guide tube characteristics and similar practical considerations.

I claim:

1. A push-pull wire feed system having a plurality of wire feed motors arranged in tandem for feeding a welding wire at a uniform rate from a supply source to a welding unit, the feed motors including a pull motor located at the welding unit and at least one push motor located between the unit and the wire supply, and means for dividing the wire feed load between the pull motor and the push motor comprising:
   a. means for controlling application of power to the pull motor for maintaining it at a constant speed representing a selected wire feed speed,
   b. the pull motor having a load torque rating in a selected ratio to that of the push motor,
   c. and means jointly responsive to control quantities representing respectively, the instant load torques of the pull motor and the push motor for controlling application of power to the push motor and normally maintaining its load torque in generally similar ratio to that of the pull motor throughout the range of wire feed load.

2. A wire feed system as specified in claim 1 wherein the push motor control quantities are voltages produced by deriving means respectively, according to manifestations of the load torques of the pull and push motors, and means for comparing the derived voltages are adapted to produce a control signal representing deviation of the push motor load torque from its normal ratio to the pull motor load torque, for controlling application of correction power to the push motor.

3. A wire feed system as specified in claim 2 wherein the comparing means constitutes a summing input network for a high-gain regulating amplifier, and a polarized output of the amplifier represents the deviation signal for activating the power controlling means.

4. A wire feed system as specified in claim 3 wherein the power controlling means constitutes transistorized switching means that is responsive to the magnitude of the polarized error signal for applying power pulses of corresponding duration to the push motor.

5. A wire feed system as specified in claim 1 wherein the ratio of the rated load torque of the push motor to the rated load torque of the pull exceeds unity.

6. A wire feed system as specified in claim 1 wherein the means for controlling application of power to the push motor constitutes on-off switching means for energizing the push motor by power pulses corresponding in duration to the control quantity difference.

7. A wire feed system as specified in claim 1 having means for comparing two control signals representing respectively a maximum load torque reference for the push motor and the instant load torque of the push motor, and means responsive to the difference between the signals for reducing the application of power to the push motor when its load torque exceeds the reference load torque.

8. In a push-pull wire feed system having a plurality of wire feed motors arranged in tandem for feeding a welding wire at a uniform rate from a supply source to a welding unit, the feed motors including a pull motor located at the welding unit and at least one push motor located between the unit and the power supply, the method of dividing the feed load between the pull motor and the push motor which comprises:
   a. operating the pull motor at a constant speed representing a selected reference wire speed throughout the normal load torque range of the pull motor,
   b. and applying power to the push motor according to the proportional variation between its instant load torque and that of the pull motor for maintaining the push motor torque in approximately fixed ratio to the pull motor torque.

9. The method as specified in claim 8 wherein power is applied to the push motor according to the difference between a reference control voltage representing the instant pull motor torque and a control voltage representing the instant push motor torque for slaving in the fixed ratio the push motor torque to the pull motor torque.

10. The method as specified in claim 8 wherein the ratio of the rated push motor load torque to the rated pull motor load torque exceeds unity.

11. The method as specified in claim 8 wherein a control quantity representing instant push motor torque is compared with a reference quantity representing maximum permissible push motor torque for reducing the power applied to the push motor when its torque exceeds the reference torque.

UNITED STATES PATENT OFFICE
CERTIFICATE OF CORRECTION

Patent No. 3,586,221          Dated June 22, 1971

Inventor(s) Marvin Rosen

It is certified that error appears in the above-identified patent and that said Letters Patent are hereby corrected as shown below:

In the Abstract: In the 11th line, "form" should be --from--
Column 4, line 26, after the " remove the minus sign
Claim 5, last line after "pull" insert --motor--

Signed and sealed this 30th day of November 1971.

(SEAL)
Attest:

EDWARD M. FLETCHER, JR.
Attesting Officer

ROBERT GOTTSCHALK
Acting Commissioner of Patents